United States Patent Office 3,207,766
Patented Sept. 21, 1965

---

3,207,766
NEW AZIDO-BENZENESULFONYL UREAS AND PROCESS FOR THEIR MANUFACTURE
Walter Aümuller, Kelkheim, Taunus, and Gerhard Korger and Rudi Weyer, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 17, 1962, Ser. No. 210,539
Claims priority, application Germany, July 21, 1961, F 34,487
18 Claims. (Cl. 260—347.2)

The present invention relates to new azido-benzenesulfonyl ureas of the formula

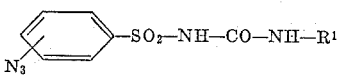

where $R^1$ represents a saturated or unsaturated aliphatic or alicylic hydrocarbon radical that may be interrupted by oxygen and/or sulfur and that has from 2 to 8 carbon atoms or—in the case of cyclic compounds—from 3 to 8 carbon atoms, or a benzyl- or β-phenyl-ethyl radical, and to the salts of these compounds which exhibit hypoglycemic action and due to their high activity are suitable as oral antidiabetic drugs.

The present invention is also concerned with the manufacture of such benzene-sulfonyl ureas, carried out according to the processes which are generally applied for producing sulfonyl ureas.

It is possible, for instance, to react correspondingly substituted benzenesulfonyl isocyanates with amines of the formula $R^1—NH_2$. Instead of these amines, there may also be applied their derivatives, for example correspondingly formylated amines, and the products obtained may be converted into the desired products by hydrolization. The new benzenesulfonyl ureas, however, may also be obtained in a reverse reaction by reacting isocyanates of the formula $R^1—NCO$ with correspondingly substituted benzenesulfonic acid amides, advantageously in the form of their salts. Instead of the benzenesulfonyl isocyanates as well as of the isocyanates of the formula $R^1—NCO$, generally there may also be applied such compounds which in the course of the reaction form such isocyanates or react like such isocyanates.

There is a further possibility of reacting correspondingly substituted benzenesulfonyl carbamic acid esters, which possess a low molecular alkyl group or a phenyl radical in the ester component; or, likewise, corresponding benzene sulfonyl monothiocarbamic acid esters with amines of the formula $R^1—NH_2$; or, inversely of reacting carbamic acid esters of the formula $$R^1—NH—COOR^2,$$

wherein $R^2$ represents a low molecular alkyl group or a phenyl radical, or correspondingly substituted monothiocarbamic acid esters with benzenesulfonic acid amides.

Carbamic acid halides, too, may be favourably applied. Thus, the desired compounds may be obtained from correspondingly substituted benzenesulfonyl carbamic acid halides and amines of the formula $R^1—NH_2$, or conversely, from carbamic acid halides of the formula $R^1—NH—CO—Hal$ and correspondingly substituted benzenesulfonic acid amides.

Furthermore, corresponding benzenesulfonyl ureas unsubstituted on the side of the urea molecule opposite to the sulfonyl group, or once or twice substituted by other alkyl groups or aryl radicals may be converted into the desired compounds by the reaction with amines of the formula $R^1—NH_2$ advantageously in the form of their salts. Instead of benzenesulfonyl ureas substituted in this way, there may also be used corresponding N-benzenesulfonyl-N′-acyl ureas or bis(benzenesulfonyl)-ureas. One possible way, for instance, is to react bis-(benzenesulfonyl)-ureas or N-benzenesulfonyl-N′-acyl ureas with amines of the formula $R^1—NH_2$, and to heat the salts obtained to temperatures higher than 100° C.

Furthermore, one may use as starting materials ureas of the formula $R^1—NH—CO—NH_2$ or acylated ureas of the formula $R^1—NH—CONH$ aryl, wherein "acyl" favourably represents a low molecular aliphatic or aromatic acid radical or the nitro group; or to use as starting materials diphenyl ureas of the formula $$R^1—NH—CO—N—(—C_6H_5)_2$$

or dialkyl ureas of the formula $R^1—NH—CO—NH—R^1$, and to react these compounds with correspondingly substituted benzenesulfonic acid amides.

Basified urea-derivatives, for instance isourea ethers, guanidines, or salts of mono-$R^1$-substituted parabanic acids may further be reacted with tertiary amines together with correspondingly substituted benzene sulfonic acid halides, and the benzenesulfonyl isourea ethers, benzenesulfonyl guanidines, or benzenesulfonyl parabanic acids may be converted into the desired benzenesulfonyl ureas by hydrolysis.

It is also possible to prepare the corresponding substituted benzenesulfonyl thioureas and to replace the sulfur atom of the thiourea group in the usual manner by an oxygen atom, while using for example oxides or heavy metal salts, or while applying oxydizing agents such as hydrogen peroxide, sodium peroxide and nitrous acid.

Finally, it is also possible to use correspondingly substituted aminobenzenesulfonyl ureas as starting materials; they are diazotized and the corresponding diazonium compounds are converted, according to the method described by Bretschneider, into the desired aminobenzenesulfonyl ureas, while using toluene sulfonamide or another sulfonic acid amide.

This reaction proceeds according to the following formula:

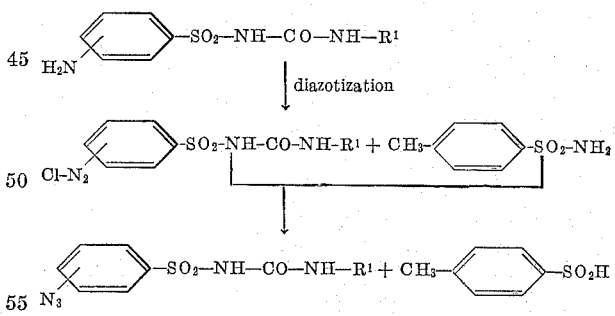

According to the present invention there enter into consideration as starting materials para-, meta-, and ortho-azido-benzenesulfonic acid halides, as well as corresponding amides, isocyanates, carbamic acid esters, ureas, isoureas, guanidines, parabanic acids, thioureas and the like. Acido-benzenesulfonic acid derivatives can be manufactured according to various methods known from literature.

According to the process of the present invention, the following amines enter into consideration for the reaction with the above-mentioned benzenesulfonic compounds:

Ethylamine, n-propylamine, isopropylamine, butylamine-(1), butylamine-(2), 2-methyl-propylamine-(1), 2 - methyl-propylamine - (2), pentylamine - (1), pentylamine-(2), pentylamine-(3), 3-methyl-butylamine-(1), hexylamines such as hexylamine-(1), and 2-methyl-pentylamine-(1), heptylamines such as heptylamine-(1), heptylamine-(4); octylamines such as octylamine-(1). Furthermore, there may be mentioned alkenylamines such as allylamine and crotylamine; cycloalkylamines such as cyclopentenylamine, cyclopentylamine, cyclohexylamine, cyclohexenylamine, cycloheptylamine, cyclooctylamine, 4-methyl-cyclohexylamine, and 2,5-endo-methylene-cyclohexylamine; and cycloalkylalkylamines such as cyclohexylmethylamine and cyclohexylethylamine. As aliphatic or cycloaliphatic compounds which are interrupted by an oxygen or sulfur atom, there may be mentioned, for example, 3-methoxy-propylamine, 3-ethoxy-propyl-amine, 4-methoxy-butylamine, tetrahydro-α-furfurylamine, 3-methyl-mercapto-propylamine and 3-ethylmercapto-propylamine. Furthermore, 2-phenyl-ethylamine-(1) and benzylamine may be used.

Instead of said amines, there may also be applied carbamic acid esters, carbamic acid halides, ureas, isoureas, and parabanic acids which can be prepared from these amines, for the reaction with suitable azidobenzenesulfonyl compounds.

The ways of operation of the process according to the invention may, generally, be varied to a large extent and adapted to the conditions of each individual case. The reactions may be carried out, for instance, while using solvents, at room temperature or at an elevated temperature. In order to obtain the products in a form as pure as possible, they are suitably completely separated from the benzene sulfonamides used as starting substances or formed in the course of the reaction. This separation may be favorably effected by taking up the product according to the invention in considerably diluted ammonia, filtering off any undissolved matter and precipitating the desired benzenesulfonyl urea by acidification.

The benzenesulfonyl ureas obtained in the process of the present invention are valuable medicaments because of their pharmacodynamic properties. The new compounds are characterized, in particular, by a strong hypoglycemic activity and a low toxicity. In tests on rabbits, for example, the N-(4-azido-benzenesulfonyl)-N'-isobutyl urea in the form of the sodium salt causes a maximum blood sugar lowering effect of 58% when orally administered in doses of 400 milligrams/kilogram. The corresponding maximum value for the N-(4-methyl-benzenesulfonyl)-N'-n-butyl urea already known and applied on a large scale in the therapy, amounts to 40%. Even when administered in "threshold doses" the new azido-benesulfonyl ureas still exhibit a significant action on the blood sugar level. Thus, for example, the N-(4-azidobenzenesulfonyl)-N'-isobutyl urea orally administered in the form of the sodium salt and in doses of not more than 50 milligrams/kilogram causes on the rabbit a maximum blood sugar lowering effect of 36%. The corresponding value for the known N-(4-methyl-benzenesulfonyl)-N'-n-butyl urea amounts to 31%.

Also after an oral administration of N-(azido-benzenesulfonyl)-N'-cyclohexyl urea in a dose of 400 milligrams/kilogram the maximum blood sugar lowering effect amounts to 40% (even 24 hours after the administration the blood sugar level is still lowered by 25%); after an administration in a threshold dose of 50 milligrams/kilogram, the maximum blood sugar lowering effect amounts to 35%. If the same compound is administered to dogs in a threshold dosis of 5 milligrams/kilogram, a considerably strong and long lasting blood sugar lowering effect was determined, which after 6 hours amounts to 22%, after 24 hours to 14%, and after 48 hours still to 5%. After an oral administration of 400 milligrams/kilogram of N-(4-azido-benzenesulfonyl)-N'-n-propyl urea to rabbits in the form of the sodium salt, a maximum blood sugar lowering effect of 40% was obtained. When orally administered to rabbits in a dosis of 400 milligrams/kilogram, the N-(4-azido-benzenesulfonyl)-N'-cycloheptyl urea causes a maximum blood sugar lowering effect of 40% which still may be observed after a period of 24 hours. The same compound orally administered to rabbits in doses of 5 milligrams/kilogram, causes a long lasting maximum blood sugar lowering effect of 46%; after 48 hours, the lowering effect still amounted to 11%; and after 72 hours, still to 4%. The high efficiency of this last compound could be proved by tests on dogs; a threshold dosis of 5 milligrams/kilogram was orally administered and after 24 hours a blood sugar lowering effect of 26%, after 48 hours of 11%, still could be observed; after 72 hours, the blood sugar lowering effect still amounted to 3%.

In pharmacological tests, especially on rabbits, very long lasting blood sugar level lowering effects could be determined when the afore-mentioned compounds were used as well as a number of further compounds obtained according to the present invention, so that the compounds in question are considerably superior to known similar compounds, for example N-(4-methyl-benzenesulfonyl)-N'-n-butyl urea, also with respect to the blood sugar lowering effects exerted.

Since they do not contain an amino group in para-position in the benzene cycle, the products of the present invention do not show effects which might be compared with those of sulpha drugs therapeutically used against infection diseases, so that no anti-reactions must be expected even when the medicaments are applied for years. Due to the same reason, no side reactions will occur which would indicate an injury of the intestinal flora.

The products of the present invention shall be used for the manufacture of orally administered preparations exhibiting blood sugar lowering action, applied in the treatment of diabetes mellitus, and may be administered as such or in the form of their salts, or of substances which are able to form salts. As such salt forming substances there may be used, for example, alkaline agents, such as alkali- or earth alkali-hydroxides, -carbonates or -bicarbonates; furthermore, physiologically compatible organic bases.

The preferred medical preparations are tablets which beside the products of the invention contain the usual adjuvants and carriers, such as talcum, starch, lactose, tragacanth, magnesium-stearate and the like.

The following examples serve to illustrate the present invention but they are not intended to limit it thereto.

EXAMPLE 1

*N-(4-azido-benzenesulfonyl)-N'-isobutyl urea*

30 grams of 4-azido-benzenesulfonic acid amide are suspended in 70 cc. of acetone. 140 cc. of an aqueous solution of caustic soda, containing 6 grams of sodium hydroxide are added to the suspension. The whole is cooled to 10° C. while stirring, and 15 grams of isobutyl isocyanate are slowly added dropwise. After a further 30 minutes stirring, the suspension is rendered weakly acid by means of dilute acetic acid, and subsequently the precipitate obtained is suctioned off. The raw product is reprecipitated by dissolution in about 1 liter ammonia of 1% strength, by filtration while adding charcoal, and by acidification. The N-(4-azido-benzenesulfonyl)-N'-isobutyl urea obtained in good yield melts at 127° to 129° C. after having been recrystallized from ethanol. Analogously, the N-(3-azido-benzenesulfonyl)-N'-isobutyl urea is obtained while using 3-azido-benzenesulfonic amide and isobutylisocyanate.

EXAMPLE 2

*N-(4-azido-benzenesulfonyl)-N'-n-butyl urea*

(a) 48.2 grams of N-(4-azido-benzenesulfonyl)-urea (manufactured from azidobenzenesulfonic acid amide by boiling with potassium cyanate in an aqueous alcoholic solution under reflux; melting point 167–169° C. while forming bubbles), 500 cc. of toluene, 16 grams of n-butylamine and 13.2 grams of glacial acetic acid are heated for 90 minutes to the boiling point while stirring and under reflux. The somewhat dull solution is suspended 3 times with 200 cc. of aqueous ammonia of 1% strength each time; the aqueous phase is clarified with charcoal and acidified by means of acetic acid. The precipitate obtained can be purified by dissolution in ammonia of 1% strength and reprecipitation with acetic acid. Melting point: 95–97° C., yield obtained: 41 grams. After recrystallization from ethanol, the N-(4-azido-benzenesulfonyl)-N'-n-butyl urea melts at 99–101° C.

(b) 27.1 grams of N-(4-amino-benzenesulfonyl)-N'-n-butyl urea are dissolved in 25 cc. of concentrated acetic acid and 200 cc. of water. The solution is diazotized with 6.9 grams of sodium nitrite in 300 cc. of water by slowly adding dropwise the nitrile solution at a temperature of 4–8° C. while stirring. A solution of 17.1 grams of para-toluenesulfonic acid amide in 200 cc. of a solution of caustic alkali of 10% strength is added to the diazonium solution while cooling with ice. The brown solution obtained is allowed to rest for 40 hours in the dark at room temperature, and then acetic acid is added. The precipitate obtained is further purified by dissolution in ammonia of 1% strength, and by reprecipitation with acetic acid. After recrystallization from ethanol, 9.5 grams of N-(4-azido-benzenesulfonyl)-N'-n-butyl urea melting at 96–98° C. is obtained.

EXAMPLE 3

N-(4-azido-benzenesulfonyl)-N'-n-propyl urea

As described in Example 2a, the N-(4-azido-benzenesulfonyl)-N'-n-propyl urea is obtained when 36 grams of N-(4-azido-benzenesulfonyl)-urea are boiled for 90 minutes together with 10 grams of propyl amine, 10 grams of acetic acid and 300 cc. of toluene under reflux while stirring; the compound melts at 138–140° C. after recrystallization from ethanol.

EXAMPLE 4

N-(4-azido-benzenesulfonyl)-N'-β-phenylethyl urea 36 grams of N-(4-azido-benzenesulfonyl)-urea are dissolved in 400 cc. of toluene with 20 grams of β-phenyl-ethylamine and 10 grams of glacial acetic acid as described in Example 2a. The N-(4-azido-benzenesulfonyl)-N'-β-phenyl-ethyl urea, obtained in good yield, melts at 116–118° C. after recrystallization from ethanol.

EXAMPLE 5

N-(4-azido-benzenesulfonyl)-N'-cycloheptyl urea 12.8 grams of N-(4-azido-benzenesulfonyl)-carbamic acid methyl ester (manufactured by reacting azido-benzenesulfonic acid amide in acetone with chloroformic acid methylester in the presence of potassium carbonate, melting point 127–129° C. after recrystallization from isopropanol) and 5.7 grams of cycloheptyl amine are thoroughly mixed; the mixture is heated for 90 minutes in the oil bath to a temperature of 130° C. The clear melt obtained is heated on the vapour bath together with ammonia of 1% strength. After having filtered off any undissolved substance while adding charcoal, the filtrate is acidified with acetic acid. The precipitate obtained is dissolved in ammonia of 1% strength and reprecipitated by adding acetic acid. The N-(4-azido-benzenesulfonyl)-N'-cycloheptyl urea purified in this way, melts at 146–148° C. while forming bubbles after recrystallization from ethanol.

EXAMPLE 6

N-(4-azido-benzenesulfonyl)-N'-cyclohexyl-urea 24.6 grams of N-(4-azido-benzenesulfonyl)-N'-cyclohexyl thiourea melting at 174–175° C. (manufactured by reacting 4-azido-benzenesulfonamide with cyclohexyl mustard oil in the presence of ground potassium carbonate and acetone) are dissolved in 600 cc. of acetone and in the course of 1 hour at a temperature of 0 to +5° C. 6.1 grams of sodium nitrite dissolved in 40 cc. of water and 48 cc. of 5 n-acetic acid are continuously added to the substance. The whole is stirred for 2 hours at room temperature, diluted with acetone and filtered off from the sulfur which has been developed in the course of the reaction; the filtrate then is concentrated. Subsequently water is added, the precipitate is filtered off with suction and crystallized twice from methanol. Thereby the N-(4-azido-benzenesulfonyl)-N'-cyclohexyl urea is obtained, which melts at 163–164° C.

Analogously, there may be obtained the N-(4-azido-benzenesulfonyl)-N'-cyclohexylmethyl urea, melting at 162–163° C. (from methanol) from N-(4-azido-benzenesulfonyl)-N'-cyclohexylmethylthiourea melting at 150°–151° C.

Analogously, the N-(4-azido-benzenesulfonyl)-N'-cycloheptyl urea melting at 146–148° C. is obtained from the N-(4-azido-benzenesulfonyl)-N'-cycloheptyl-thiourea melting at 101–102° C.

EXAMPLE 7

N-(3-azido-benzenesulfonyl)-N'-isobutyl urea 23.4 grams of 3-azido-benzenesulfonamide are dissolved in 250 cc. of acetone; 31 grams of ground potassium carbonate is added to the solution, and the whole is boiled for 1 hour under reflux. Subsequently, 11 grams of isobutyl-isocyanate are added dropwise and the reaction mixture is stirred for 17 hours at a temperature at 55° C. Then the acetone is distilled off, the residue is dissolved in water, the solution is clarified with charcoal and filtrate is standardized against a pH-value of 7. The small amount of lubricate solution obtained thereby is removed, formaldehyde sodiumsulfoxylate is added to the filtrate, and the whole is again clarified with charcoal. The clear solution now obtained is acidified with dilute hydrochloric acid, the precipitate is filtered off with suction, washed with water and dried on the vapour bath. After recrystallization from acetic ester, the N-(3-azido-benzenesulfonyl)-N'-isobutyl urea melts at 158–159° C. (under decomposition).

Analogously the N-(3-azido-benzenesulfonyl)-N'-cyclohexyl urea is obtained while using cyclohexyl isocyanate; it melts at 158–160° C. after recrystallization from methanol (under decomposition).

Analogously the N-(3-azido-benzenesulfonyl)-N'-cyclopentyl urea is obtained while using cyclopentyl isocyanate; it melts after recrystallization from methanol and dilute acetone at a temperature of 160–162° C. (under decomposition).

EXAMPLE 8

N-(4-azido-benzenesulfonyl)-N'-α-tetrahydrofurfuryl urea 37 grams of 4-azido-benzenesulfonyl carbamic acid methyl ester are mixed with 15.5 grams of α-tetrahydrofurfuryl amine; the salt thereby formed is heated for 15 minutes to 125–130° C. After having been cooled, the reaction mixture is dissolved in dilute ammonia; the solution is standardized against a pH-value of 7, clarified with charcoal and the filtrate is acidified with dilute sulfuric acid. The precipitate obtained after the suction and washing process is recrystallized from dilute methanol. N-(4-azido-benzenesulfonyl)-N'-α-tetrahydrofurfuryl urea is obtained, which melts at 135–137° C. (under decomposition).

Aanalogously, the N-(4-azido-benzenesulfonyl)-N'-cyclooctyl urea is obtained while using cyclooctyl amine; it melts at 132–137° C. (under decomposition) after recrystallization from methanol.

While using cyclopentylamine, analogously the N-(4-azido-benzenesulfonyl-N'-cyclopentyl urea is obtained which melts at 142.5–144° C. (under decomposition) after having been recrystalized from dilute methanol.

Analogously the N-(4-azido-benzenesulfonyl)-N'-(4-methyl-cyclohexyl)-urea is obtained while using 4-methyl-cyclohexylamine; it melts at 150–152° C. (under decomposition) after having been recrystallized from dilute methanol.

When using benzylamine, the N-(4-azido-benzenesulfonyl)-N'-benzyl urea is obtained, which melts at 181–182° C. (under decomposition) after having been recrystallized from acetone/methanol.

The N-(4-azido-benzenesulfonyl)-N'-(3'-methoxypropyl)-urea is likewise obtained while using 3-methoxypropylamine; it melts at 118–120° C. (under decomposition) after recrystallization from dilute methanol.

EXAMPLE 9

N-(3-azido-benzenesulfonyl)-N'-cycloheptyl urea 20 grams of N-(3-azido-benzenesulfonyl)-N'-cycloheptyl-thiourea melting at 129–131° C. (prepared by reacting 3-azido-benzenesulfonamide with cyclohepyl mustard oil in the presence of ground potassium carbonate and acetone) are dissolved in 400 cc. of acetone. A solution of 4.8 grams of sodium nitrite in 20 cc. of water together with 34 cc. of 5 n-acetic acid is continuously added to the solution during 1 hour at a temperature of 0 to +5° C., while stirring.

The reaction mixture is stirred for 2 hours at room temperature; the substance is filtered off from the sulfur formed in the course of the reaction; the filtrate is concentrated in vacuo. The whole is diluted with water, the precipitate obtained is filtered off with suction and recrystallized from dilute methanol. The N-(3-azido-benzenesulfonyl)-N'-cycloheptyl urea, melting at 163–164° C. (under decomposition) is obtained.

We claim:
1. A compound selected from the group consitsing of (1) a benzensulfonyl urea of the formula

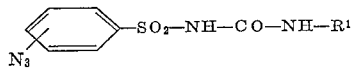

wherein $R^1$ is a member selected from the group consisting of (i) alkyl and alkenyl of from 2 to 8 carbon atoms each, (ii) cycloalkyl and cycloalkylalkyl of from 3 to 8 carbon atoms each, (iii) 3-methoxypropyl, 3-ethoxypropyl, 4-methoxybutyl, tetrahydro-α-furfuryl, 3-methylmercapto-propyl and 3-ethylmercapto-propyl, (iv) benzyl, and (v) β-phenyl-ethyl and (2) pharmaceutically accetpable basic salts thereof.

2. N-(4-azido-benzenesulfonyl)-N'-isobutyl urea.
3. N-(4-azido-benzenesulfonyl)-N'-n-butyl urea.
4. N-(4-azido-benzenesulfonyl)-N'-n-propyl urea.
5. N-(4-azido-benzenesulfonyl)-N'-β-phenylethyl urea.
6. N-(4-azido-benzenesulfonyl)-N'-cycloheptyl urea.
7. N-(4-azido-benzensulfonyl)-N'-cyclohexyl urea.
8. N-(4 - azido-benzenesulfonyl)-N'-cyclohexylmethyl urea.
9. N-(3-azido-benzenesulfonyl)-N'-isobutyl urea.
10. N-(3-azido-benzenesulfonyl)-N'-cyclohexyl urea.
11. N-(3-azido-benzenesulfonyl)-N'-cyclopentyl urea.
12. N - (4-azido-benzenesulfonyl)-N'-α-tetrahydrofurfuryl urea.
13. N-(4-azido-benzenesulfonyl)-N'-cyclooctyl urea.
14. N-(4-azido-benzenesulfonyl)-N'-cylcopentyl urea.
15. N-(4-azido-benzensulfonyl)-N'-(4 - methyl - cyclohexyl)-urea.
16. N-(4-azido-benzenesulfonyl)-N'-benzyl urea.
17. N - (4 - azido - benzenesulfonyl)-N'-(3'-methoxypropyl)-urea.
18. N-(3-azido-benzenesulfonyl)-N'-cycloheptyl urea.

References Cited by the Examiner

UNITED STATES PATENTS

| | | | |
|---|---|---|---|
| 2,254,191 | 8/41 | Roblin | 260—397.7 X |
| 2,907,692 | 10/59 | Haack et al. | 260—553 X |
| 2,955,073 | 10/60 | De Beer | 167—65 |
| 2,974,166 | 3/61 | Aeschlimann et al. | 260—553 |
| 2,975,212 | 3/61 | Wagner et al. | 260—553 |
| 2,977,375 | 3/61 | Haack et al. | 260—553 |
| 3,004,889 | 10/61 | Kuna et al. | 167—65 |
| 3,030,388 | 4/62 | Moore et al. | 260—553 |

OTHER REFERENCES

Banks et al.: J. Am. Chem. Soc., vol. 70, pages 1268–1269 (1948).

WALTER A. MODANCE, *Primary Examiner.*

IRVING MARCUS, NICHOLAS S. RIZZO, JOHN D. RANDOLPH, *Examiners.*